June 28, 1960 — C. E. ROSENHAGEN — 2,942,386
LAP ASSEMBLY
Filed May 13, 1957
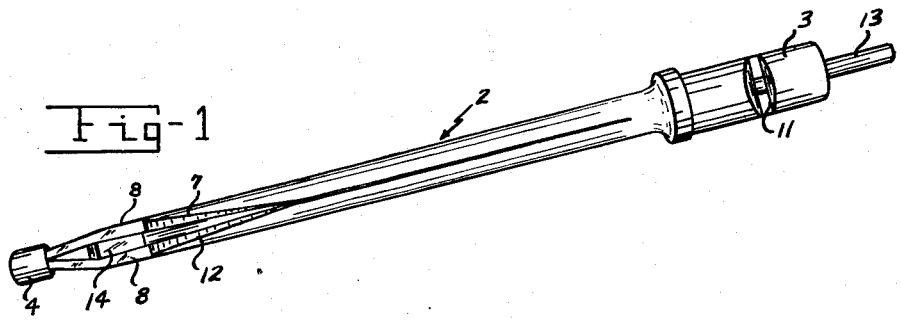
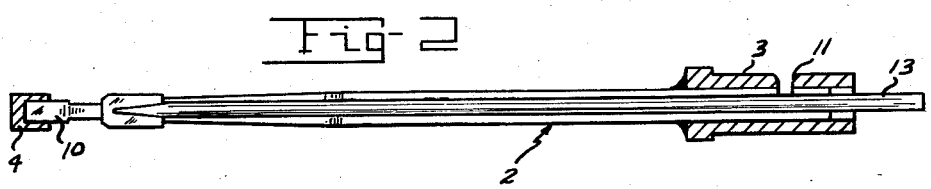
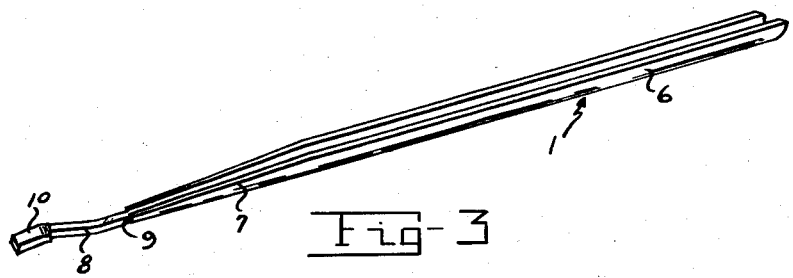
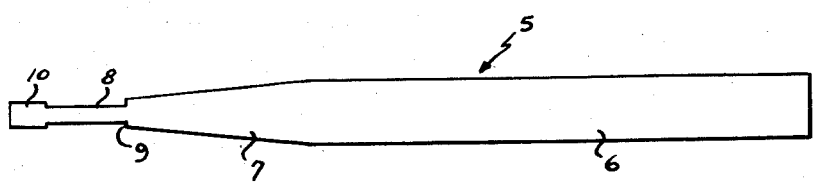
INVENTOR.
CARL E. ROSENHAGEN
BY Tom Walker
ATTORNEY

United States Patent Office 2,942,386
Patented June 28, 1960

2,942,386

LAP ASSEMBLY

Carl E. Rosenhagen, 939 Westminster Place,
Dayton, Ohio

Filed May 13, 1957, Ser. No. 658,871

2 Claims. (Cl. 51—184.3)

This invention relates to lap devices and more particularly to an improved lap assembly providing a long bearing surface, having unusual rigidity and precision adjustment features.

Lapping problems are prevalent in present day mass production activity, particularly where slight boring or drilling inaccuracies occur, or where holes of small dimension are to be lapped. For example, a problem exists where the longitudinal extent of the hole being lapped requires a lap providing a long bearing surface. Prior art laps have proven inefficient in this area since their construction is of a nature to cause them to have a tendency to spring and flex, making it difficult to maintain a uniform precision lap. Other problems occur due to the fact that the prior art lap devices generally lack precision adjustment capabilities and this in conjunction with their inherent lack of uniform rigidity when provided with a long bearing surface has caused the process of removing an arc or bow from a crooked hole to be costly and difficult. These deficiencies in prior art laps or lap assemblies have many times resulted in wasted time, effort and material and, in many instances, in poor product quality.

The present invention corrects the above noted deficiencies in the prior art and provides improvements in lap assemblies which make them fast, accurate and economical to use in all areas, even for lapping small holes. The present invention is greatly simplified relative to the prior art since machining operations are substantially eliminated. A substantial economy results thereby. The lap components are simple, preformed and readily assembled in a minimum of time and with a minimum of effort to provide a lap assembly having high torsional strength and a long operating life. The construction is such to afford a lap assembly having a wide range of precision expansion and a long bearing surface which is maintained extremely rigid throughout so as to provide the resulting assembly with the ability to take the bow or arc out of crooked holes and to precision lap holes of smallest diameters.

The object of the invention is to simplify the construction as well as the means and mode of operation lap assemblies, whereby such assemblies may not only be economically manufactured, but will be more efficient and satisfactory in use, adaptable to a wide variety of applications, and be unlikely to get out of order.

Another object of the invention is to provide an improved lap assembly providing a long bearing surface having extreme rigidity throughout.

A further object of the invention is to provide an improved lap having high torsional strength and a long operating life.

An additional object of the invention is to provide a lap which is capable of taking the arc or bow out of crooked holes incorporating means for precision adjustment thereof over a wide range of expansion.

Another object of the invention is to provide an improved lap which can produce an accurate hole at low cost.

A further object of the invention is to provide an improved lap assembly incorporating an expansion device for precision adjustment thereof throughout a wide range which results in the lap having a long bearing surface and extreme rigidity throughout.

A further object of the invention is to provide lap assemblies possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 shows a plan view of a lap assembly in accordance with the invention;

Fig. 2 shows a longitudinal cross sectional view of the assembly of Figure 1;

Fig. 3 is a perspective view of the half shell element employed in the assembly of Figures 1 and 2; and Fig. 4 is a detailed plan view of the blank from which the shell element of Fig. 3 is formed.

Like parts are indicated by similar characters of reference throughout the several views.

The invention can be best described with reference to the illustrative embodiment in the drawings. As generally shown in Fig. 1, the lap assembly consists of a plurality of shell elements 1 of a mating nature which form a generally tubular lap body 2 contained at one end by a drive sleeve 3 in press fit relation and welded thereto.

A ferrule 4 is sweated over the lap body 2 at its other end in a manner to be further described in detail herein.

The mating shell elements 1 are of an identical nature and each formed from a blank illustrated in Fig. 4 of the drawings. The blank 5 is of elongated strip form and preferably heavy gauge, hard brass. Its configuration is such that it is uniformly rectangular throughout its major extent from one end 6 thereof. The sides of the blank 5 are then uniformly tapered inwardly toward its longitudinal axis to provide a tapered extension 7 of the section 6. From the extremity of the tapered section 7 the lateral dimension of the blank is further reduced to provide a narrow extension 8 of rectangular form defined at its inner end by the shoulder 9 effected by the reduction of the width of the strip and at the other end by a rectangular enlargement 10 which affords the remote end of the blank.

The blank 5 is then formed and coined to effect an arcuate cross section thereto symmetrical from its longitudinal axis. The rectangular section 6 of the blank is thus established in substantially cylindrical form with its lateral extremities defining a radial plane. The tapered section 7 following the rectangular section 6 is similarly arcuately formed and its lateral extremities uniformly diverge from the plane of the lateral extremities of the section 6 in a manner clearly apparent in the drawings. The forming of the blank thus disposes the thin rectangular extension 8 in alignment with the longitudinal axis of the blank which defines its apex as formed. Intermediate its ends, the strip extension 8 is bent in towards the radial plane defined by the lateral extremities of the section 6 and its rectangularly enlarged extremity 10 is disposed to establish its under surface in a plane common to the said radial plane.

In fabricating the lap assembly the shell elements 1 are placed in aligned relation to establish the respective lateral extremities of the sections 6 in abutting relation to one end and the enlargements 10 to the other end of said shells in abutting relation. The drive sleeve 3 is press fit and welded over the shells, as previously noted, to contain the lateral extremities of the section 6 in their aligned abutting relation and form the tubular lap body 2 thereby.

A notch 11 is cut in the drive sleeve and through shell elements 1 providing means for locking the assembly to a driving head as will be described. The ferrule 4 which is sweated over the abutting rectangular ends 10 of the shells contains them in fixed relation to the other end of the assembly. This, in effect, welds the respective ends of the shells together and effects a spring tension in the shells intermediately thereof.

The position of the identical shell elements provides that their tapered sections form aligned tapered slots 12 between the shell elements adjacent their contained extremities 10. These aligned slots 12 are defined at the outer extremity of the sections 7 by the rectangular strip extensions 8 of the shell elements which are uniformly spaced and converge in symmetrical fashion to the containing ferrule 4.

The assembly so formed affords a housing for a rod element 13 which bears between the shell elements and extends outwardly of the driving sleeve 3 as indicated in the drawings. This rod 13 is at least as long as the lap body and has a wedge element 14 of a generally rectangular nature fixed to the inner end thereof to project laterally of the shell elements within the slots 12. The wedge section 14 is longitudinally tapered from its extremity adjacent to ferrule 4 to the rod element to which it is fixed. As shown in Fig. 1 of the drawings the wedge element is normally disposed by the rod or draw bar 13 intermediate the strip sections 8 of the shell elements. This establishes the lap at its normal minimum dimension.

In use, the lap body 2 may be locked to a driving head by engagement of a detent in the driving head into the lock notch in the driving sleeve 3. This will fix the lap body against movement relative to the driving head. The operating means provided for adjustment of the lap body in precision fashion will be engaged to the projecting end of the rod or draw bar 13. As will be apparent, by drawing the bar 13 outwardly from the sleeve end of the lap body the wedge element 14 will slowly be drawn into the tapered slots 12 to gradually expand the shell body and thereby increase the lapping dimension provided by the assembly.

It will be noted that the configuration of the flat rectangularly enlarged end 10 on the shell elements enables the ferrule dimension to always be less than that of the minimum dimension of the lap body. The coining of the shell elements 1 sets a spring tension in them as they are fixedly connected at their extremities.

The normal disposition of the wedge between the angular edges or lateral extremities of the shells adjacent the ferrule 4 and the closely contained relation of the rod 13 throughout the length of the shells provides a lap body with a long bearing surface which is reinforced and unyielding throughout its length allowing no breathing or flexing of the body in out-of-round or tapered holes. The use of the separate pre-formed shell elements enables a precision expansion of the lap body 2 by the wedge 14 acting in the radial plane of contact.

The assembly thus provides a lap having high torsional strength which can be precisely expanded and can constantly maintain a long bearing without flexing. These features of the resulting lap assembly enable small holes to be accurately lapped and crooked holes to be easily straightened, without twisting or breakage of the laps.

It is believed that the advantages and the utility of the improved lap assembly provided will be readily apparent to those versed in the art.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An adjustable lap comprising a plurality of substantially identical formed elements superposed to abut at their lateral extremities in opposed fashion the major extent thereof, a tubular configuration resulting therefrom, said elements being tapered to one end and diverted at the extremity thereof to establish said extremities to abut in the plane of the aforesaid abutting surfaces, a cap fixed about said abutting extremities having an external dimension less than that of said superposed elements and a sleeve fixed in containing relation to the elements at their other end providing means for engagement thereof to a driving head, the tapered portions of said elements mutually defining diametrically opposed longitudinal slots expanding to said extremities and means bearing within said elements having means engaging in the slots for expanding said elements.

2. A lap assembly including, a plurality of formed elements in mating relation, said elements to one end defining a cylindrical unit and mounting a rod element in bearing contained relation thereto, said elements at said one end meeting in diametral planes, the other ends of said elements diverging from said diametral planes and having the extremities thereof bent to meet in said diametral planes, means fixing said extremities in their contacting relation, and means on said rod element normally lying between said elements in the area of their diverging portions whereby on movement of said rod precision adjustment of the peripheral dimension of said mating elements obtains.

References Cited in the file of this patent
UNITED STATES PATENTS

| | | |
|---|---|---|
| 246,885 | Huber | Sept. 13, 1881 |
| 1,201,614 | Oakley | Oct. 17, 1916 |
| 1,395,245 | Anderson | Nov. 1, 1921 |
| 1,428,658 | Rasmusen et al. | Sept. 12, 1922 |
| 2,714,279 | Rosenhagen | Aug. 2, 1955 |